United States Patent
Chandran

(10) Patent No.: US 7,499,971 B1
(45) Date of Patent: Mar. 3, 2009

(54) ALTERNATE JAVA SERVER PAGE (JSP) PROCESSING FOR BETTER RESPONSE TIME

(75) Inventor: Anish Chandran, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/054,104

(22) Filed: Mar. 24, 2008

(51) Int. Cl.
*G06F 15/16* (2006.01)
*G06F 12/00* (2006.01)

(52) U.S. Cl. .................. 709/203; 709/217; 709/218
(58) Field of Classification Search ............... 709/217, 709/218, 203, 250
See application file for complete search history.

(56) References Cited

U.S. PATENT DOCUMENTS

| | | | |
|---|---|---|---|
| 6,023,724 A * | 2/2000 | Bhatia et al. ............... 709/218 |
| 6,671,854 B1 * | 12/2003 | Dunsmoir et al. ........... 715/207 |
| 6,697,849 B1 | 2/2004 | Carlson | |
| 7,162,687 B2 | 1/2007 | Pelegri-Llopart et al. | |
| 7,219,350 B2 | 5/2007 | Bhogal et al. | |
| 2003/0050995 A1 * | 3/2003 | Mateos ....................... 709/217 |
| 2003/0140100 A1 | 7/2003 | Pullara | |
| 2005/0086631 A1 | 4/2005 | Nakaike et al. | |
| 2005/0262042 A1 | 11/2005 | Kondo | |
| 2007/0058634 A1 * | 3/2007 | Gupta et al. ................. 370/392 |
| 2007/0094267 A1 * | 4/2007 | Good et al. .................. 707/10 |

* cited by examiner

*Primary Examiner*—Zarni Maung
(74) *Attorney, Agent, or Firm*—MaxValueIP, LLC

(57) ABSTRACT

One embodiment provides a jumbled-document type, which acts as the vehicle for the idea and to briefly explain the JSP processing mechanism. A new MIME type named text/jumbled-html is introduced, in place of text/html, to generate HTML output from the JSP. Other than the proposed text/jumbled-html document type, the implementation is totally contained within a given server product. A jumbled-html document will contain all the segments (explicitly demarcated at segment boundaries), if broken into segments, but in a jumbled sequence. Adopting this mechanism, which is transparent to the users and JSP developers, experienced response times to end-user (while accessing a dynamic page) is reduced considerably.

1 Claim, 2 Drawing Sheets

ALTERNATE JAVA SERVER PAGE (JSP) PROCESSING FOR BETTER RESPONSE TIME

BACKGROUND OF THE INVENTION

The existing mechanism of Java Server Pages (JSP) processing may result in sub-optimal end user response times and impacts bandwidth between HTTP server and Web Container tiers, especially for large sites.

In most enterprise websites with large number of users, there is a tier of HTTP servers before a tier of Web Containers. The tier of HTTP servers is typically meant to load-balance requests to the Web Containers. Also for efficiency, they are normally configured to directly serve requests for static content (e.g., html or image files).

One of the major reasons why JSP came into being is the numerous printlns in servlets. JSP is more oriented towards the web page designer. It looks more similar to the resulting page, thus, it is easy to write or modify from the page designer's perspective. However, for execution, a JSP is still converted into a servlet and to its many printlns running at the web container. So a good amount of the out-print( ) statements still prints static content, i.e. some of the text printed is identical, while executing any given request. Therefore, when a JSP is converted into servlet, what had been specifically marked by the developer as static content becomes undistinguishable among the dynamic content at runtime.

As a result, the following problems exist:

(1) Once a routed request from an HTTP server arrives at a Web container, there is a latency waiting for the resources for execution to be allocated from the pool, before any content could be served. In addition, there is the latency of forwarding the request by the HTTP server. Thus, all this time the client (browser) is waiting with nothing to do while the dispatching of the static portion could have potentially begun, as soon as the HTTP server had gotten the request. In addition, if the static content contained references to resources that need to be fetched—such as images (i.e. the <IMG> tags), the browser could have initiated a request to fetch the referenced resource (e.g. GIF files), while waiting for the dynamic portion of the response.

(2) In the current scenario, the declared static portion of the JSP cannot be served by the tier of HTTP servers, which means there is more traffic between the HTTP servers and Web Containers, as well.

SUMMARY OF THE INVENTION

When an HTTP server receives a request for the said JSP, it forwards the request to the corresponding servlet. Simultaneously, it starts writing the file.static that corresponds to the requested JSP, as response to the client (browser). When it has written the whole file, it reads the http response from the servlet and writes it, while excluding the response header to the output stream of the HTTP response to the client.

One example of this invention includes these features: 1. The experienced response times to end-user, while accessing a dynamic page is reduced considerably. 2. There is less band-width wasted between the tiers of HTTP servers and Web Containers. 3. Implementation of the mechanism is transparent to the users and JSP developers. 4. Scenarios where JSPs are indirectly accessed can be accommodated.

One embodiment employs a jumbled document type, which acts as the vehicle for the idea and to briefly explain the JSP processing mechanism. In the case of a JSP which generates HTML output, the MIME type is currently text/html. Instead, a new type named text/jumbled-html is introduced. Other than the proposed text/jumbled-html document type, the implementation is totally contained within a given server product.

This embodiment is applied to optimizing JSP processing and similar approaches, such as ASP and PHP for serving web content.

DETAILED DESCRIPTION OF THE PREFERRED EMBODIMENTS

A JSP page is basically a web page with traditional HTML and bits of Java code. The file extension of a JSP page is jsp, rather than .html or .htm, which tells the server that this page requires special handling that will be accomplished by a server extension or a plug-in.

Figure 1:
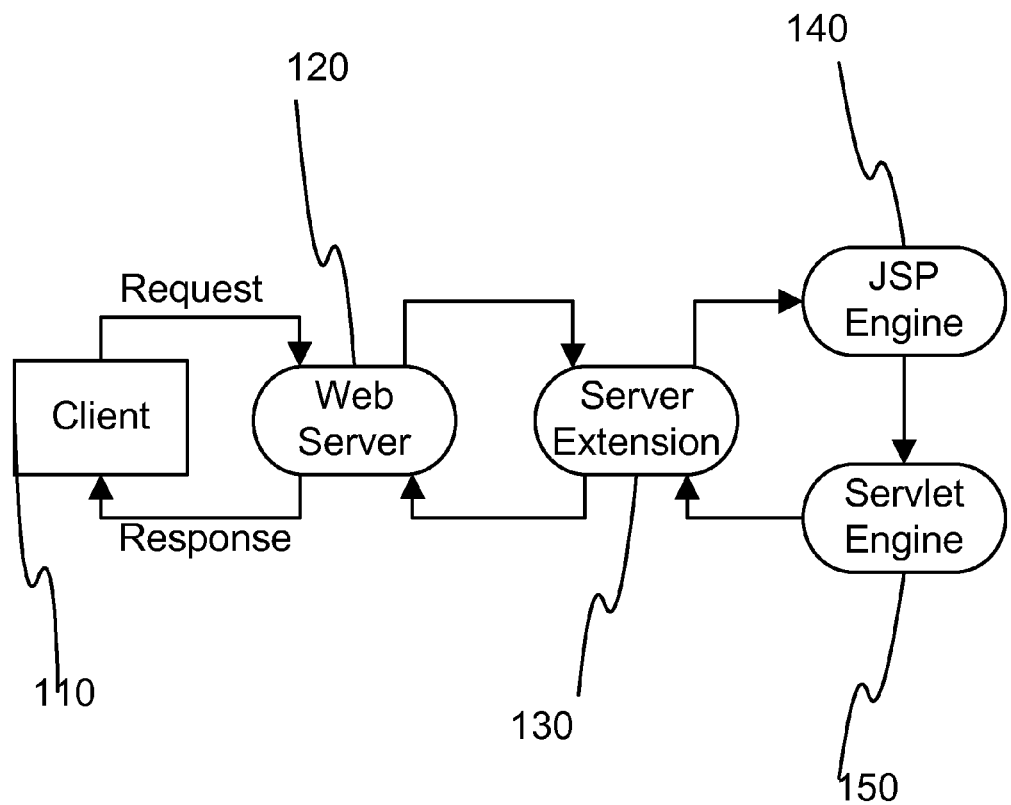
FIG. 1 is a schematic diagram of request/response flow calling a JSP page. (JSP model architecture)

When a JSP page is called, it will be compiled by the JSP engine (140) into a Java servlet. At this point the servlet is handled by the servlet engine (150), just like any other servlet. The servlet engine then loads the servlet class (using a class loader) and executes it to create dynamic HTML to be sent to the browser (110), as shown in FIG. 1. (120, 130) The servlet creates any necessary object, and writes any object as a string to an output stream to the browser.

The next time the page is requested, the JSP engine executes the already-loaded servlet, unless the JSP page has changed, in which case it is automatically recompiled into a servlet and executed.

A JSP page can consist of one or more files, for example, the file containing a top-level JSP page, several files containing dynamically included JSP pages, and several files containing statically-included JSP segments. Unlike the top-level or dynamically-included pages, JSP segments need not be legal JSP pages, and thus, may not compile properly.

The Web Container can maintain both the old format servlet and the proposed format servlet for each JSP. If a browser supports the jumbled-html document type, it mentions that in the Accept attribute in the HTTP request header, so that the new mechanism is used. If the Accept attribute in the request header does not include jumbled-html, the Web Server can forward the request to the old format servlet.

If an html document stream was to be broken into segments, a jumbled-html document will contain all the segments (explicitly demarcated at segment boundaries), but in a jumbled sequence. In addition, for instance, each segment could have two segment attributes: Segment Sequence Number which is the sequence number of this segment, if the segments were ordered correctly, and an optional Number of Segments, which is the total number of segments in the document.

Typically, the first segment in the sequence will carry the Number of Segments attribute so that the original html document can be constructed from the jumbled-html.

A JSP document can be seen as alternating logical segments of static content and code for generating dynamic output. Therefore, when a JSP document is deployed, the logical segments containing static content are extracted and stored in a file with explicit segment separators between the segments. Each segment stored to the file will have the sequence number of its corresponding logical segment within the JSP, as value for its Segment Sequence Number attribute. The first segment in the file will also have the "Number Of Segments" attribute, set to the total number of logical segments in the JSP file. This file, hereafter referred to as file-.static, will be stored by the HTTP servers.

As in the existing scenario, a servlet will be generated for the JSP document being deployed, but without any print statements to print the static content into the response stream. Instead, print statements will be inserted to print the segment separators between the segments holding dynamic content and the logical Segment Sequence Number of the respective segments (as in the JSP). As a result, if this servlet is to be executed at runtime and its output stream appended to the file stored at the HTTP servers, a jumbled-html document will be obtained that would correspond exactly to the html document that would have been produced by the JSP executing through the existing mechanism.

From the first segment that the client (browser) receives in the response stream, it gets the total number of segments. It constructs that many sequential slots and places (each received segment to a slot), based on its Segment Sequence Number. The client can also process the segments, as they come in, and create threads that make HTTP requests for resources (e.g., image files), referred by the segments already received. Also, if the data from segments received at a given point is sufficient to provide an overall visual structure of the whole page, it can get started with the rendering job.

Handling errors in servlet execution: Some aspects of error propagation can be handled differently by different servers. As for the common part, if a processing error is encountered in the servlet, the servlet will end the current segment that it is printing, by printing a segment separator. It then outputs one segment that carries the configured Error page. This segment will have both Segment Sequence Number and Number of Segments attributes set to one. When the client (browser) gets a mid-stream segment, which includes the Number of Segments, it overrides the existing value. So, the client then assumes there is just one segment and that being the current segment carrying error page. Thus, the configured Error page can be displayed.

For example, currently, for a servlet which does not flush the output stream, it collects the whole response and sends it together. So, it is able to set the Content-Length attribute in the response header, and also processing error results in Response code of 500. But, if explicit output stream flushes are made in a servlet, it does not set Content-Length, but sets Transfer-Encoding with value chunked. Even if there is a processing error, the Response code is still 200.

For implementing the proposed mechanism, "Transfer-Encoding: chunked" must be used in the response header. For encoding like gzip, "Transfer-Encoding: gzip, chunked" should be used, which is fully in compliance with HTTP 1.1.

The first chunk in the response is prepared beforehand to contain all the segments that carry the static content, i.e. the file (file.static) maintained by the HTTP servers. The size of each of the remaining chunks (carrying dynamic content), can be configured at or determined by the HTTP servers.

For propagating processing errors in terms of the Response code, the trailing header fields, Chunked Transfer Coding of RFC-2616, can be used to send the Response code.

The following explanation covers a more general concept jumbled-document (above explanation for text/jumbled-html served as an example) and about using that jumbled-document to perform processing of any arbitrary JSP file (above was a simplified consideration of JSP format for ease of illustrating the main idea).

The description of proposed jumbled-document MIME type is as follows, which acts as the vehicle for the idea, and to briefly explain the JSP processing mechanism, based on the new MIME type, in an alternate embodiment:

1. The jumbled-document MIME type:

A jumbled-document can contain several fragments (clearly demarcated) of a normal sequential document, with each fragment embodied in what can be called a frame. Also, the frames in the jumbled-document are not necessarily in the order of their contained fragments' order in the corresponding original document.

Note: Frame separators, Frame types, and header fields (Frame Id, Sequence Number) need not be explicit in the format, as assumed in the discussion here. For example, if it is to be made as a jumbled-html type, these may be made implicit, or may be assigned to a different form. They are explicitly provided, just to help explaining the method.

Frame: Every frame has two header fields:

1. Frame Id—Identifies a frame uniquely from among frames of the same document. (Allowed Values: 1, . . . , n)

2. Sequence Number—Defines the order of the frame's payload in the represented document. (Allowed Values: 0, . . . , n) (Duplicates allowed)

There are two types of frames:

Data Frame —Its payload is a fragment of the original document

Pointer Frame—Its payload consists of 2 pointers (called left pointer and right pointer, respectively). Each of those pointers is a Frame Id that points to another Frame (of type either Data or Pointer) in the document. A pointer carrying Frame Id value of 0 (zero) is assumed to be pointing to a virtual Data Frame, with Frame Id 0, Sequence Number 0, and an empty payload. Every document is assumed to carry implicitly, this imaginary virtual Data Frame.

Client side jumbled-document MIME type handler:

It takes care of re-assembling the original document from the received file of type jumbled-document.

The original document would be formed by merging the content of frames starting from the frame with Sequence Number 1, till the frame with Sequence Number n, in ascending order, where n is the largest Sequence Number in any frame of the received jumbled-document document.

The frames of the document will be processed from beginning to end of the jumbled-document. If a frame is received carrying a Sequence Number value which is same as that for a previous frame, the later processed frame replaces the earlier processed frame in the frame sequence that is used to build the resulting document (through merging of content mentioned previously).

Content of a Frame:

Content of a Data Frame—The content of a Data Frame is its payload.

Content of a Pointer Frame—A Pointer Frame represents the root of a binary tree (with left pointer pointing to the left sub-tree and right pointer pointing to the right sub-tree), containing Pointer Frames as non-leaf nodes and Data Frames as leaf nodes (typically many of them being the virtual Data Frame, defined above). If any preorder/inorder/postorder traversal of the said binary tree is done and the fragments received from the Data Frames encountered are merged together, in the order in which they appear in the traversal, the Content of the Pointer Frame is obtained.

Declaration Frames: Frames with Sequence Number 0 (zero) will not appear in the sequence that is used to build the resulting document. However such frames can be pointed to by Pointer Frames that does appear in the sequence, resulting in their content appearing among the content of such Pointer Frames, and thus, forming part of the resulting document.

Forward referencing: If forward referencing (from Pointer Frames) is required, the MIME type handler will in effect have a 2-pass algorithm.

2. Using jumbled-document MIME type in JSP processing:

The MIME type defined above is versatile enough to allow the server to make any change to the target document, while the response stream is open. Here is one direct way of using the jumbled-document format that will be used for this purpose.

On reception of a request, the http server will check the request header to see if the client has mentioned jumbled-document as a supported MIME type, as well as if the URL pattern refers to a dynamic page to be processed by the web container. If only both are true, then the proposed mechanism is used. Otherwise, the course of action would be the existing JSP processing.

If both conditions true (i.e. eligible for proposed mechanism):

As previously mentioned, .static file contains all the static segments of its corresponding JSP. Each of these segments would be contained in a Data Frame with Sequence Number value 0 (zero) and Frame Id value from (1 . . . m) (where m is the number of static segments of the JSP).

The new-format servlet in the web container corresponding to the JSP will write Data Frames (each carrying a dynamically generated fragment) and Pointer Frames (each having left pointer pointing to one of the static fragments in the corresponding .static file, already sent by the http server, i.e. with a Frame Id value between (1 . . . m), and right pointer having a Frame Id value of 0 (zero), i.e. pointing to the virtual Data Frame, resulting in empty content for the right sub-tree).

The new-format servlet written frames (both Data and Pointer) have Sequence Number starting from 1 (first written frame) to n (last written frame).

So, assuming that the First frame is a Pointer Frame, it will have a Sequence Number of 1 and Frame Id of m+1. The second frame would then be a Data Frame with Sequence Number 2 and Frame Id of m+2, and so on.

Error Handling: During processing of dynamic content, if an error is encountered and the Frame being prepared at that instant has a Sequence Number n, then n−1 Data Frames, each with an empty payload and carrying sequence numbers 1 to n−1 is written to the output stream and closed. The header is handled similar to the flushing/non-flushing case explained earlier.

Figure 2:
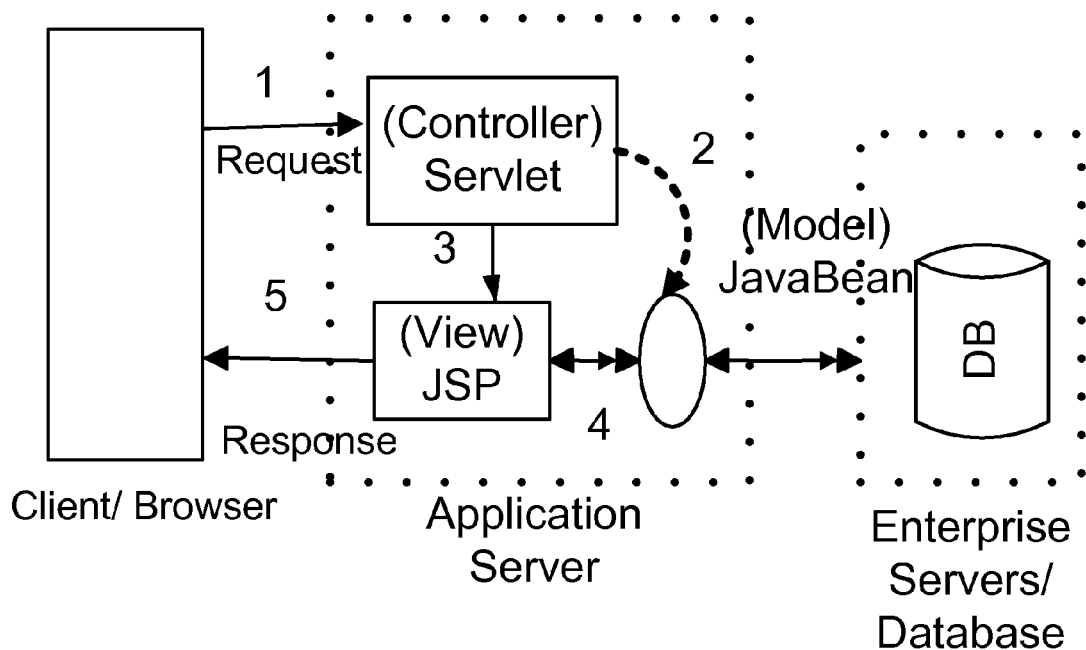
FIG. 2 is a schematic diagram of JSP Model View Controller (MVC) Architecture.

One of the embodiments of the invention is: (as shown, for example, in FIG. 2, items 1, 2, 3, 4, and 5, for one of the embodiments, above and below):

A method for processing a server page for enhancing response time for rendering server page on a web client, the method comprising:

Deploying the server page on a web container server;

Dividing the server page to one or more segments;

Wherein each first segment of the one or more segments is associated with a sequence number, representing an order in which the first segment appears in the server page. Based on a content of the first segment, the first segment is either logically static or dynamic storing each second segment of the one or more segments that are static and an associated segment separator in a static file corresponding to the server page.

Including a total number of segments of the one or more segments within the second segment which appears first in the static file;

Deploying the static file on a web server;

Generating a servlet on the web container server corresponding to the server page, wherein the servlet comprises of one or more print statements to a container response stream object, each third segment of the one or more segments that are dynamic, and the sequence number that the third segment is associated with;

The web client sending a request for a resource associated with the server page to the web server at runtime. The request indicates that the web client supports a jumbled-document multipurpose internet mail extensions type.

The web server forwarding the request to the web container server;

The web server sending a client response stream to the web client;

The web server monitoring for a web container response stream from the web container server;

The web server writing a content of the static file to the client response stream;

The web server appending the web container response stream to the client response stream, after removing a header portion of the web container response stream;

and the web client constructing a client response content from the client response stream in a predetermined format, by merging a content of each the first segment of the one or more segments, in ascending order of the sequence number that the first segment is associated with.

A system, apparatus, or device comprising one of the following items is an example of the invention: JSP, HTTP, web container, Java, servlet, Java Server, load balancing, printlns, server, client device, PDA, mobile device, cell phone, storage to store the messages, router, switches, network, communication media, cables, fiber optics, physical layer, buffer, nodes, packet switches, computer monitor, or any display device, applying the method mentioned above, for purpose of server and response times and management.

Any variations of the above teaching are also intended to be covered by this patent application.

The invention claimed is:

1. A method for processing a server page for enhancing response time for rendering said server page on a web client, said method comprising:

deploying said server page on a web container server;

dividing said server page to one or more segments;

wherein each first segment of said one or more segments is associated with a sequence number representing an order in which said first segment appears in said server page;

wherein based on a content of said first segment, said first segment is either logically static or dynamic;

storing each second segment of said one or more segments that are static and an associated segment separator in a static file corresponding to said server page;

including a total number of segments of said one or more segments within said second segment which appears first in said static file;

deploying said static file on a web server;

generating a servlet on said web container server corresponding to said server page;

wherein said servlet comprises of one or more print statements to a container response stream object, each third segment of said one or more segments that are dynamic, and said sequence number that said third segment is associated with;

said web client sending a request for a resource associated with said server page to said web server at runtime;

wherein said request indicates that said web client supports a jumbled-document multipurpose internet mail extensions type;

said web server forwarding said request to said web container server;

said web server sending a client response stream to said web client;

said web server monitoring for a web container response stream from said web container server;

said web server writing a content of said static file to said client response stream;

said web server appending said web container response stream to said client response stream after removing a header portion of said web container response stream; and said web client constructing a client response content from said client response stream in a predetermined format by merging a content of each said first segment of said one or more segments, in ascending order of said sequence number that said first segment is associated with.

* * * * *